United States Patent [11] 3,549,911

[72] Inventor Joseph H. Scott, Jr.
Newark, N.J.
[21] Appl. No. 781,511
[22] Filed Dec. 5, 1968
[45] Patented Dec. 22, 1970
[73] Assignee RCA Corporation
a corporation of Delaware

[54] VARIABLE THRESHOLD LEVEL FIELD EFFECT MEMORY DEVICE
5 Claims, 7 Drawing Figs.

[52] U.S. Cl. .......... 307/279, 307/205, 307/235, 307/251, 307/304; 330/35
[51] Int. Cl. .......... H03k 17/60
[50] Field of Search .......... 307/205, 235, 246, 251, 279, 304; 330/35, 38(FE)

[56] References Cited
UNITED STATES PATENTS

| | | | |
|---|---|---|---|
| 3,348,062 | 10/1967 | Carlson et al. | 307/235 |
| 3,369,129 | 2/1968 | Wolterman | 307/304X |
| 3,374,312 | 3/1968 | Thomas | 307/304X |
| 3,444,397 | 5/1969 | Lym | 307/304X |
| 3,462,701 | 8/1969 | Miller | 330/38(FE)X |

*Primary Examiner*—Stanley T. Krawczewicz
*Attorney*—H. Christoffersen

ABSTRACT: A bistable field effect transistor having a metal insulator semiconductor structure in which a charge can be stored, is used as a memory element. The application of a voltage of greater than a given amplitude between the gate and source electrodes of the transistor changes the threshold level of the device from a first to a second value depending on the polarity of the applied voltage. The threshold voltage, to which the transistor is set, is maintained and stored after the removal of the excitation voltage.

INVENTOR
JOSEPH H. SCOTT, JR.

BY H. Christoffersen
ATTORNEY

VARIABLE THRESHOLD LEVEL FIELD EFFECT MEMORY DEVICE

BACKGROUND OF THE INVENTION

Semiconductor active devices are of great interest for use as memory elements. They are fast, inexpensive, require little power, occupy a small amount of space, and may be integrated to form large arrays. However, there is room for much improvement in a number of areas. For example, commercially available storage circuits of this type generally employ a minimum of four or five elements such as transistors or the like, for each bit of stored information. If the number of elements per bit could be reduced to, for example, one transistor per bit, the number of storage cells which could be packed into a given area would be increased correspondingly, by a factor of four or five.

A number of proposals have been made in the past to meet this need. One is the ferroelectric transistor. A ferroelectric transistor is a semiconductive body whose conduction path is altered by polarizing a ferroelectric maintained in proximity to the body to alter the surface charge on a portion of that body. However, in practice such devices have proved extremely difficult to manufacture and have been highly unstable.

Another deficiency of commonly employed semiconductor device storage circuits is that any interruption or loss of power applied to the devices causes the loss of the stored information.

It is an object of the present invention to provide a new and improved active element storage circuit which exhibits a reproducible and stable hysteresis loop as a function of applied voltage and which retains its stored information whether or not power is present.

BRIEF SUMMARY OF THE INVENTION

Circuits embodying the invention include a bistable field effect transistor having a source electrode, a drain electrode and a gate electrode. The transistor is of the type which, in response to a first voltage of greater than a given value applied between its gate and source electrodes in a direction to forward bias the gate with respect to the source, exhibits a first threshold value, and which, in response to a second voltage of greater than a given value applied between its gate and source electrodes in a direction to reverse bias the gate with respect to the source, exhibits a second threshold value. Voltages are applied between the source and gate electrodes for selectively setting the threshold value of the transistor into one of its two states. Sampling voltages are also applied to the gate electrode to sense the state in which the transistor has been set. This provides nondestructive read-out of the information contained in the transistor.

DETAILED DESCRIPTION

Figure 1:
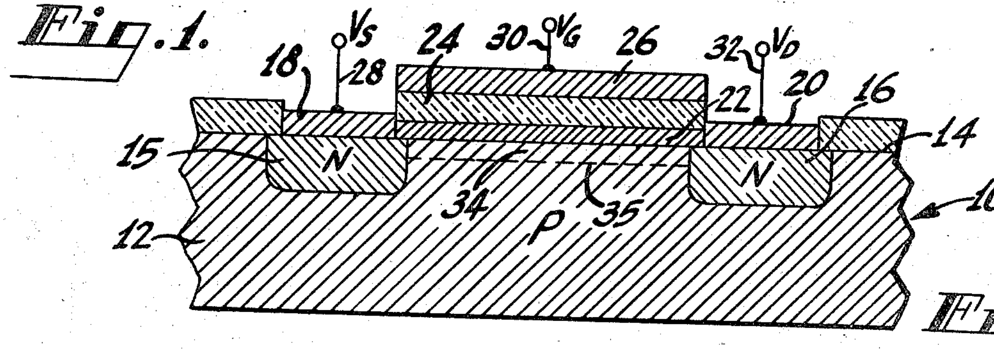
FIG. 1 is a cross-sectional view of one embodiment of the type of semiconductor device which may be used to practice the invention.

FIG. 1 shows a depletion-type, insulated gate field effect transistor 10 suitable for practicing the invention. The transistor 10 includes a body 12 of semiconductive material of given conductivity type, such as P-type silicon, which has an upper surface 14. Adjacent to the surface 14 are spaced regions 15 and 16 of conductivity type opposite to that of body 12, which constitute source and drain regions, respectively, for the transistor 10. The distance between regions 15 and 16 defines the width of the conduction channel. Contacts 18 and 20 are formed on the surface 14 in ohmic contact with the regions 15 and 16.

Overlying the channel space between the regions 15 and 16 is a structure which comprises the gate and charge-storing elements of the transistor 10. The first layer adjacent to the surface 14 in the space between the regions 15 and 16 is a thin layer 22 of insulating material, such as silicon dioxide.

Deposited on this layer 22 of silicon dioxide is a layer 24 of material which can accept charge carriers and confine them to localized sites adjacent the interface between the layers 22 and 24. In this example, the layer 24 is a layer of silicon nitride which is itself an insulator. On the silicon nitride layer 24 is a metallic electrode 26. Leads 28, 30 and 32, schematically shown, enable the application of external potentials to electrodes 18, 20 and 26. The conduction channel 34 existing for depletion-type transistors with zero gate voltage applied, is shown by means of the dashed line 35.

The transistor 10 may be fabricated by known techniques. For example, the source and drain regions 15 and 16 may be formed by selectively masking the surface 14 and diffusing conductivity modifying substances through spaced portions of the surface 14 into the body 12. The silicon dioxide layer may be formed by thermally oxidizing the surface of the body 12 or by the pyrolytic decomposition of an organic siloxane compound such as tetraethoxysilane on the surface 14. The silicon nitride layer may be deposited by heating body 12 in an atmosphere of silane $SiH_4$, and ammonia.

The insulating layer 24 is indicated as silicon nitride, but, equivalents having the same or similar properties may be substituted, as circumstances may suggest or render expedient, without departing from the spirit or scope of the invention. Also, though transistor 10 is shown as a depletion-type semiconductor, an enhancement device, whether of P-type or N-type silicon, having an insulator layer such as layer 24 is also suitable for practicing the invention.

The memory action of transistor 10 can be demonstrated by measuring the capacitance of the parallel plate system wherein the gate region 26 acts as one plate and the source 15 and drain 16 regions are connected to the semiconductor body 12 which acts as the other plate thereof and in which the insulating and charge storing layers act as the dielectric thereof. When the gate potential is varied, this capacitance changes in the manner illustrated in FIG. 2, i.e., with a pronounced hysteresis loop. If the applied voltage is made sufficiently negative, the capacitance will switch to a higher value and will remain in that state after the removal of the negative voltage. If the potential applied to the gate is made sufficiently positive, the capacitance is switched to the lower value and will remain that state after the removal of the positive voltage.

Figures 2, 3:
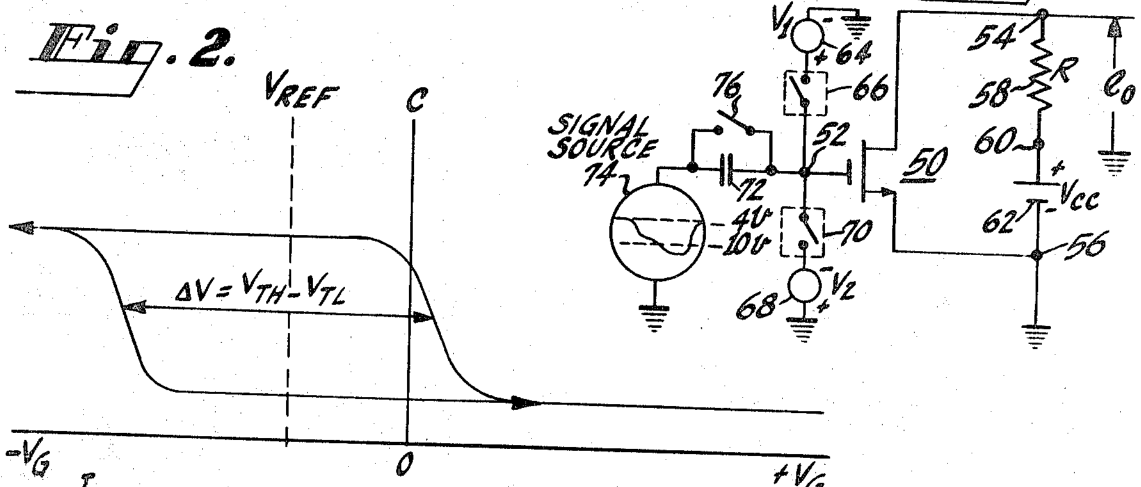
FIG. 2 is a plot of capacitance versus applied voltage illustrating the bistable character of the device.
FIG. 3 is a circuit diagram showing the device used as a variable threshold detector.

Referring to FIG. 2, it should be noted that if the gate-to-source voltage is varied about the reference point ($V_{REF}$) by an amount whose ampliture is less than plus or minus one-half the amount $\Delta V$, which may, for example, be 10 volts, the state of the transistor will be undisturbed indicating a mode of operation, which will be nondestructive of the information stored in the device.

The phenomenon just described is manifested by the device exhibiting a bivalued threshold voltage when operated as a transistor. In contrast to the change in capacitance, for an N-channel device, if the voltage applied to the gate is made sufficiently more positive than the voltage at the source electrode, the threshold voltage ($V_T$) will switch to a high value of threshold voltage ($V_{TH}$) and if the applied voltage is made sufficiently negative with respect to the source and drain electrodes, the threshold voltage is switched to a low value of threshold voltage ($V_{TL}$).

The circuit of FIG. 3 is a logic gate whose threshold may be varied thereby controlling the passage of input signals. Transistor 50 is shown with its gate electrode connected to terminal 52, its drain electrode connected to terminal 54 and its source electrode connected to reference terminal 56. A resistor 58 is connected between terminal 54 and junction point 60 and a source of potential 62 of magnitude $V_{CC}$ is connected between junction point 60 and terminal 56. Terminal 54 serves as the voltage output of the circuit while the signal across resistor 58 is indicative of the current flowing in the circuit. Potential source 62 is shown as a battery but it may instead be either pulsed, a half wave rectified, or a full rectified power source.

A source of positive potential 64 of magnitude $V_1$ may be connected by means of switch 66 to the gate 52 and a source of negative potential 68 of magnitude $V_2$ may be connected by means of switch 70 to gate electrode 52. The gate terminal 52 is also connected to one terminal of capacitor 72, the other terminal of the capacitor being connected to signal generator 74. Switch 76, connected across capacitor 72, may be used to shunt out the capacitor and to directly couple the signal generator 74 to the gate of transistor 50. Note that while for purposes of the present explanation, the switches are shown to be mechanical switches, in practice they may be electronic devices such as field effect transistors or bipolar devices.

The amplitudes $V_1$ and $V_2$ of potential sources 64 and 68 are made sufficiently large to permit the threshold of transistor 50 to be set to either its low or high state. By way of example, for this particular case, $V_1$ and $V_2$ may each be chosen to be equal to 22.5 volts (plus in one case, minus in the other).

Figure 4A:
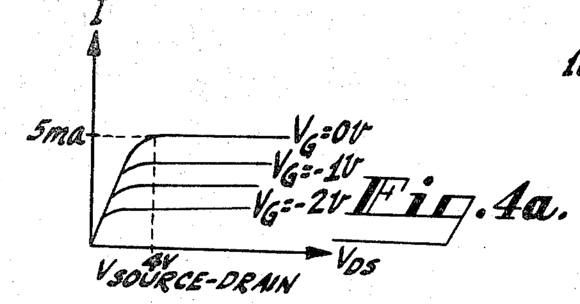
FIGS. 4*a* and 4*b* are plots of the V–I characteristics of the device when pulsed into the low and high threshold states.

For depletion-type transistor 50, the closure of switch 66 applies a positive 22.5 volts potential to the gate electrode setting its threshold voltage to $V_{TH}$, which is approximately equal to −4 volts, as indicated by the voltage-current (V–I) characteristics shown in FIG. 4*a*. Note that with a gate voltage ($V_G$) of zero volts, the drain current ($I_D$) for a drain-to-source voltage ($V_{DS}$) greater than 4 volts is approximately 5 ma. Note also that the knee of the constant current curve for $V_G=0$ corresponds to a value of 4 volts along the X axis (said axis representing the value of drain-to-source ($V_{DS}$) voltage). Since the knee of the curve occurs at a point at which $V_{DS}$ is equal to the difference between the gate and threshold voltage ($V_G - V_T$) and since $V_G$ is equal to zero, then obviously $V_T$ is equal to approximately −4 volts. When switch 66 is opened this value of $V_{TH}$ exhibited by transistor 50 is maintained so long as any potential applied to the gate electrode does not reverse bias the gate-to-source region by an amount exceeding the reference value, which in the case given by way of example is approximately −3 volts about a negative bias of −7 volts.

Figure 4B:
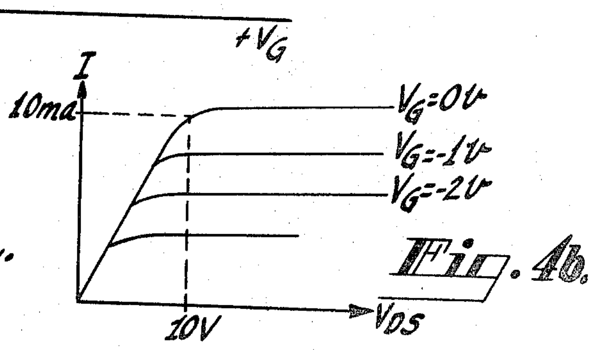

Closing switch 70, while switch 66 is open applies a negative 22.5 volts potential to the gate of transistor 50. Applying this large reverse bias between the gate and the source and drain electrodes of the device sets the transistor into its low threshold state ($V_{TL}$), as indicated in FIG. 4*b*. FIG. 4*b* is essentially the same as FIG. 4*a* except that the threshold level has been decreased by approximately 6 volts Note that in FIG. 4*b* the curve traced for the condition when $V_G$ equals 0, indicates that a current of 10 ma. is obtained along the flat portion of the curve and with the knee of the curve corresponding to the drain-to-source potential of 10 volts. The potential at which knee occurs, as explained before, indicates that the threshold voltage of transistor 50 is now −10 volts. Thus, by applying a negative potential between the gate and source electrode, the threshold voltage has been changed from −4 volts to −10 volts. This value of threshold will be maintained even though switch 70 is open and so long as any potential applied to the gate electrode does not forward bias the gate-to-source region by an amount exceeding the value of the indicated reference voltage, which in the case given, by way of example, is approximately +3 volts about a negative bias of −7 volts.

Thus, with transistor 50 in the $V_{TL}$ state any signal above −10 volts will cause conduction and result in an output signal. However, with transistor 50 set to the $V_{TH}$ state, transistor 50 will be cut off to all signals not exceeding −4 volts in amplitude. The threshold voltage is thus used to discriminate between signals of varying amplitudes. An important feature of the circuit of the present invention is that all potentials may be removed from the transistor and it will remain in the state in which it was last placed. This is of great value in memory arrays as loss of power or other computer system malfunction of similar nature does not destroy the stored information.

Figure 5:
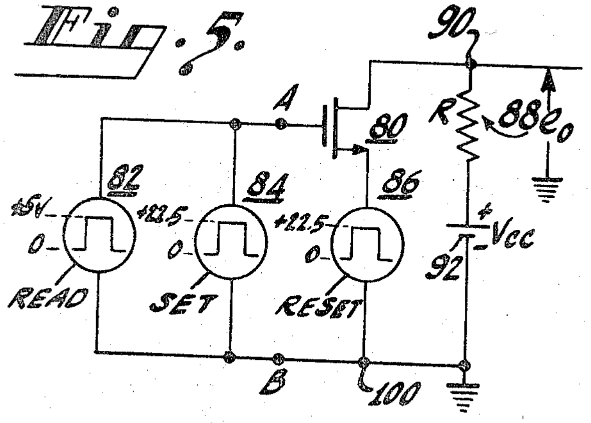
FIG. 5 is a schematic diagram showing the device used as a single element memory device.

FIG. 5 shows a flip-flop or memory circuit comprising transistor 80 which, for this example, will be assumed to be an N-channel device of the enhancement type having a silicon nitride layer as described in FIG. 1. The gate electrode of transistor 80 is shown connected to one side of signal generators 82 and 84, whose internal impedances are sufficiently high to prevent one generator from shorting the other and, the other end of said signal generators is connected to terminal 100 shown as reference or ground potential. Signal generator 86 is shown connected between terminal 100 and the source electrode of transistor 80. The drain of transistor 80 is shown connected to resistor 88 at terminal 90, which also serves as the output terminal. The other end of resistor 88 is connected to the positive terminal of potential source 92 of amplitude $V_{CC}$, the negative terminal of potential source 92 being connected to terminal 100.

As shown in FIG. 5, the amplitude of the signal from signal sources 84 and 86 is bivalued being either zero volts or 22.5 volts. With generators 86 and 82 at ground potential, a 22.5 volt pulse from generator 84 forward biases the gate-to-source region of transistor 80 setting the transistor to its high voltage $V_{TH}$ state, which for example, may be equal to +10 volts. A read pulse from generator 82 having a value greater than $V_{TL}$ but less than $V_{TH}$ applied to the gate of transistor 80 will not be sufficient to overcome the value of threshold voltage and no signal will be observed at terminal 90. Depending on the definition of the logic levels this condition may, for example, correspond to the set condition of a flip-flop or the storing of a logic "1" or a logic "0" in a memory cell since the output voltage is maintained at $+V_{CC}$ and there is no conduction of current in the drain source path of transistor 80.

Figure 6:
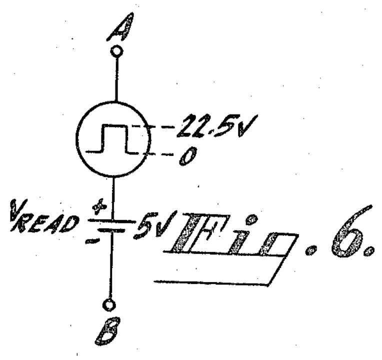
FIG. 6 is a schematic diagram showing a series means to set and read out the memory element of FIG. 5.

With signal generators 82 and 84 now returned to ground potential, signal generator 86 may be triggered to provide a positive pulse of 22.5 volts amplitude to the source electrode. This pulse provides a reverse bias to the source-gate region, which is analogous to the condition described in FIG. 3 when switch 70 was closed. This causes transistor 80 to be set in the low threshold condition which, for example, may be equal to +4 volts. Now, a read signal from generator 82 having a value greater than $V_{TL}$ but less than $V_{TH}$ will cause current to flow between the drain and source of transistor 80 resulting in a voltage other than $V_{CC}$ at terminal 90. In keeping with the definition of logic level stated above, this state of the transistor may correspond to the reset condition of a flip-flop since the transistor is returned to the low threshold voltage state. Note that, as shown in FIG. 6, the parallel combination of generators 82 and 84 may be replaced by a DC source, whose maximum amplitude meets the requirements set for the maximum amplitude of pulse generator 82 placed in series with a pulse generator such as generator 84.

Although the device of FIG. 1 and the circuits of FIGS. 3 and 5 employ N-type conductivity transistors, it should be appreciated that P-type devices may also be employed provided that the appropriate changes are made in the connections of the bias sources and the levels of the input signals.

I claim:

1. In combination:

a field effect transistor having source, drain and gate electrodes and of the type which in response to a first voltage of greater than a given value applied between its gate and source electrodes in a direction to forward bias the gate with respect to the source exhibits a first threshold value and which in response to a second voltage of greater than a given value applied between its gate and source electrodes in a direction to reverse bias the gate with respect to the source exhibits a second threshold value;

means coupled between said source and gate electrodes for selectively applying one of said first and second voltages for establishing the threshold setting of said transistor;

means coupled between said source and gate electrodes for selectively applying thereto a read voltage of a value between said second threshold value and said given value; and means coupled to said transistor for sensing whether or not it conducts current in its source-to-drain path in response to said read voltage.

2. The combination as claimed in claim 1, wherein said transistor is an insulated gate field effect transistor.

3. The combination as claimed in claim 2, wherein said first threshold value is greater in magnitude than said second threshold value.

4. The combination as claimed in claim 3, wherein said read voltage is applied in a direction to forward bias the gate-to-source region and wherein the magnitude of said given value is less than the magnitude of said first threshold value.

5. The combination as claimed in claim 4, wherein there is no conduction in response to said read voltage when the transistor is in the first threshold setting and wherein there is conduction in response to said read voltage when the transistor is in the second threshold setting.